United States Patent
Polley et al.

(10) Patent No.: US 12,203,428 B2
(45) Date of Patent: Jan. 21, 2025

(54) JAM DETECTION AND JAM TOLERANT MOTION CONTROL

(71) Applicant: Woodward, Inc., Fort Collins, CO (US)

(72) Inventors: Matthew Polley, Arlington Heights, IL (US); Dragan Micic, Mt. Prospect, IL (US); Kamran Eftekhari Shahroudi, Fort Collins, CO (US); Joseph Thomas Kopecek, Santa Clarita, CA (US); James Cale, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/893,555

(22) Filed: Aug. 23, 2022

(65) Prior Publication Data
US 2023/0061579 A1 Mar. 2, 2023

Related U.S. Application Data

(60) Provisional application No. 63/236,525, filed on Aug. 24, 2021.

(51) Int. Cl.
| | |
|---|---|
| *F02K 1/76* | (2006.01) |
| *H02P 25/14* | (2006.01) |
| *B64D 29/00* | (2006.01) |
| *F02K 1/62* | (2006.01) |
| *F02K 1/70* | (2006.01) |
| *F02K 1/72* | (2006.01) |

(52) U.S. Cl.
CPC ............ *F02K 1/763* (2013.01); *H02P 25/145* (2013.01); *B64D 29/00* (2013.01); *F02K 1/625* (2013.01); *F02K 1/70* (2013.01); *F02K 1/72* (2013.01)

(58) Field of Classification Search
CPC . F02K 1/763; F02K 1/625; F02K 1/70; F02K 1/72; H02P 25/145; B64D 29/00
See application file for complete search history.

(56) References Cited

U.S. PATENT DOCUMENTS

| | | | |
|---|---|---|---|
| 8,169,172 B2 * | 5/2012 | Markunas | ............... H02P 21/18 318/617 |
| 9,190,942 B2 | 11/2015 | Polcuch et al. | |

(Continued)

OTHER PUBLICATIONS

U.S. Appl. No. 16/701,473, Polcuch et al., filed Dec. 3, 2019.

(Continued)

*Primary Examiner* — Todd E Manahan
*Assistant Examiner* — Rene D Ford
(74) *Attorney, Agent, or Firm* — Fish & Richardson P.C.

(57) ABSTRACT

The subject matter of this specification can be embodied in, among other things, a system that includes a flexible structure, a power inverter, a first electromechanical device configured to urge movement of a first portion of the flexible structure based on power received from the power inverter, a second electromechanical device configured to urge movement of a second portion of the flexible structure based on power received from the power inverter, a feedback sensor configured to provide a feedback signal indicative of alignment between the first portion and the second portion, and a controller configured to control operation of at least one of the first electromechanical device and the second electromechanical device based on the feedback signal.

21 Claims, 11 Drawing Sheets

(56) References Cited

U.S. PATENT DOCUMENTS

| | | | |
|---|---|---|---|
| 9,650,994 B2 | 5/2017 | Cameron | |
| 10,570,854 B2* | 2/2020 | Stone | B64D 29/00 |
| 2009/0157234 A1* | 6/2009 | Breit | B64C 13/50 |
| | | | 701/3 |
| 2010/0252691 A1 | 10/2010 | Malkin et al. | |
| 2011/0088369 A1* | 4/2011 | Maalioune | F02K 1/763 |
| | | | 60/204 |
| 2011/0285256 A1* | 11/2011 | Hyde | H02K 1/22 |
| | | | 310/68 R |
| 2012/0031995 A1 | 2/2012 | Maalioune et al. | |
| 2014/0053649 A1* | 2/2014 | Maalioune | G01N 29/4445 |
| | | | 73/583 |
| 2015/0090810 A1* | 4/2015 | Lallement | F02K 1/763 |
| | | | 239/265.19 |
| 2018/0291838 A1* | 10/2018 | Le Coq | F02K 1/763 |
| 2020/0172229 A1* | 6/2020 | Polcuch | B64C 13/16 |

OTHER PUBLICATIONS

International Search Report and Written Opinion in International Application No. PCT/US2022/075382, mailed on Oct. 24, 2023, 14 pages.

International Preliminary Report on Patentability in International Application No. PCT/US2022/075382, mailed on Mar. 7, 2024, 9 pages.

* cited by examiner

JAM DETECTION AND JAM TOLERANT MOTION CONTROL

CROSS-REFERENCE TO RELATED APPLICATION

This application claims the benefit of priority to U.S. Provisional Patent Application No. 63/236,525, filed on Aug. 24, 2021, which is hereby incorporated by reference in its entirety.

TECHNICAL FIELD

This instant specification relates to an aircraft thrust reverser actuation system.

BACKGROUND

Contemporary aircraft engines may include a thrust reverser actuation system (TRAS) to assist in reducing the aircraft speed during landing. Typical thrust reversers include a movable transcowl that when in the active position reverses at least a portion of the airflow passing through the engine. Previous thrust reverser designs have implemented thick, heavy materials for the transcowl elements, and have implemented heavy, fluid-based (e.g., hydraulic) actuators to move them. Since weight reduction is often a priority in aircraft design, lighter solutions are often sought, such as by designing lighter, thinner transcowl elements and/or by using lighter weight electrical actuators (e.g., electro-mechanical thrust reverse actuation, or EMTRAS).

One of the key challenges for hydraulic and electric TRAS is that a trend towards higher gas turbine engine bypass ratios for fuel efficiency has resulted in larger diameter more flexible translating cowls. Such modifications, however, can introduce new problems. For example, thinner transcowl elements can be relatively more flexible and subject to mechanical jamming more than their predecessors, and smaller and lighter actuators may not always be able to provide enough brute force power to prevent or overcome such flexure and jamming.

SUMMARY

In general, this document describes a thrust reverser actuation system.

In an example embodiment, a system includes a flexible structure, a power inverter, a first electromechanical device configured to urge movement of a first portion of the flexible structure based on power received from the power inverter, a second electromechanical device configured to urge movement of a second portion of the flexible structure based on power received from the power inverter, a feedback sensor configured to provide a feedback signal indicative of alignment between the first portion and the second portion, and a controller configured to control operation of at least one of the first electromechanical device and the second electromechanical device based on the feedback signal.

Various embodiments can include some, all, or none of the following features. The controller can be configured to modify an in-line impedance of at least one of the first electromechanical device or the second electromechanical device. The controller can be configured to modify a first effective impedance of a first stator winding or a first rotor winding of the first electromechanical device relative to a second effective impedance of a second stator winding or a second rotor winding of the second electromechanical device. At least one of the first electromechanical device or the second electromechanical device can be an electrical induction motor. The first electromechanical device can be mechanically linked to the second electromechanical device through the flexible structure. The flexible structure can be a translating cowl of an aircraft turbine engine thrust reverser actuation system. The feedback sensor can be configured to determine one or more of a first position output, a first velocity, a first torque, or a first coil current of the first electromechanical device, and one or more of a second position output, a second velocity, a second torque, or a second coil current of the second electromechanical device. The feedback sensor can be configured to determine one or more of a position difference, a velocity difference, a torque difference, or a coil current difference between the first electromechanical device and the second electromechanical device. The feedback sensor can be configured to measure structural stress of the flexible structure. The controller can be configured to perform one or more of position control, velocity control, torque control, or power control of at least one of the first electromechanical device or the second electromechanical device.

In an example implementation, a method of actuation includes urging, by a power inverter, movement of a first electromechanical device, urging, by the first electromechanical device, movement of a first portion of a flexible structure, urging, by the power inverter, movement of a second electromechanical device, urging, by the second electromechanical device, movement of a second portion of the flexible structure, identifying an alignment between the first portion and the second portion, and controlling operation of at least one of the first electromechanical device or the second electromechanical device based on the identified alignment.

Various implementations can include some, all, or none of the following features. Controlling operation of at least one of the first electromechanical device or the second electromechanical device can include modifying an in-line impedance of at least one of the first electromechanical device or the second electromechanical device. Controlling operation of at least one of the first electromechanical device or the second electromechanical device can include modifying a first effective impedance of a first stator winding or a first rotor winding of the first electromechanical device relative to a second effective impedance of a second stator winding or a second rotor winding of the second electromechanical device. At least one of the first electromechanical device or the second electromechanical device can be an electrical induction motor. The first electromechanical device can be mechanically linked to the second electromechanical device through the flexible structure. The flexible structure can be a translating cowl of an aircraft turbine engine thrust reverser actuation system. Identifying an alignment between the first portion and the second portion can include measuring one or more of a first position output, a first velocity, a first torque, or a first coil current of the first electromechanical device, and one or more of a second position output, a second velocity, a second torque, or a second coil current of the second electromechanical device. Identifying an alignment between the first portion and the second portion can include identifying one or more of a position difference, a velocity difference, a torque difference, or a coil current difference between the first electromechanical device and the second electromechanical device. Identifying an alignment between the first portion and the second portion can include measuring structural stress of the flexible structure. Controlling operation of at least one of the first electromechanical device and the second electromechanical device can include performing one or more of position control, velocity control, torque control, or power control of at least one of the first electromechanical device or the second electromechanical device.

In another example embodiment, a turbofan engine assembly includes a turbofan engine, a nacelle surrounding the turbofan engine and defining an annular bypass duct through the turbofan engine to define a generally forward-to-aft bypass airflow path, and a thrust reverser including a flexible element, moveable to and from a reversing position where at least a portion of bypass airflow is reversed, a power inverter, a first electromechanical device configured to urge movement of a first portion of the flexible element based on power received from the power inverter, a second electromechanical device configured to urge movement of a second portion of the flexible element based on power received from the power inverter, a feedback sensor configured to provide a feedback signal indicative of alignment between the first portion and the second portion, and a controller configured to control operation of at least one of the first electromechanical device and the second electromechanical device based on the feedback signal.

Various embodiments can include some, all, or none of the following features. The controller can be configured to modify an in-line impedance of at least one of the first electromechanical device or the second electromechanical device.

The systems and techniques described here may provide one or more of the following advantages. First, a system can provide synchronization of multiple devices configured to move a single output. Second, the system can maintain synchronization and/or alignment of multiple electrical actuators that are driven by a shared power inverter. Third, the synchronization provided by the system can enable the use of lighter, thinner, more flexible materials in thrust reverser actuator systems.

The details of one or more implementations are set forth in the accompanying drawings and the description below. Other features and advantages will be apparent from the description and drawings, and from the claims.

DETAILED DESCRIPTION

This document describes systems and techniques for synchronous motion control, including motion control for reversing aircraft turbine engine airflow. In particular, the techniques described in this document address issues that can arise when using two or more electric motors or other types of electrical actuators to move a shared output member that may flex. In previous thrust reverser actuator systems (TRAS), the moveable elements were relatively stiff, but they are thick and heavy. The use of thinner and lighter elements is beneficial to aircraft applications, but such elements can be relatively more flexible than their stiffer predecessors are. When two or more actuators are used to extend the older, stiffer moveable reverser elements, the inherent stiffness of the elements can aid in maintaining synchronicity and/or alignment among the actuators.

However, generally speaking, thinner and lighter moveable reverser elements can permit relatively more flexure and relatively less inherent mechanical ability to maintain alignment among actuators, which can lead to mechanical jamming if not addressed. Typically, individual electric machines (e.g. BLDC's) are controlled very precisely by dedicated individual drivers, one per electric motor, using techniques such as field oriented control. The challenge for EMTRAS is to use a single driver for multiple induction motors while meeting the more stringent jam detection and control needs of the more flexible translating cowl, without adding expensive or unreliable additional sensors or drivers.

In general, the systems and techniques described in this document address this issue by sensing the alignment of the moveable element and/or the synchronicity of the multiple actuators, and perform a closed-feedback control loop in order to control the actuators in order to maintain alignment and/or synchronicity. Still speaking generally, the systems and techniques described in this document also address how to perform such synchronization when using multiple electromechanical devices (e.g., motors, actuators, generators) that are driven by (or drive) a shared power source (e.g., a shared power inverter). As will be described in this document, this task can be accomplished by modifying the internal impedance of one or more of the actuators in order to alter its position, velocity, torque, current, and/or power relative to its companion actuators and bring the moveable element back into alignment.

Figure 1:
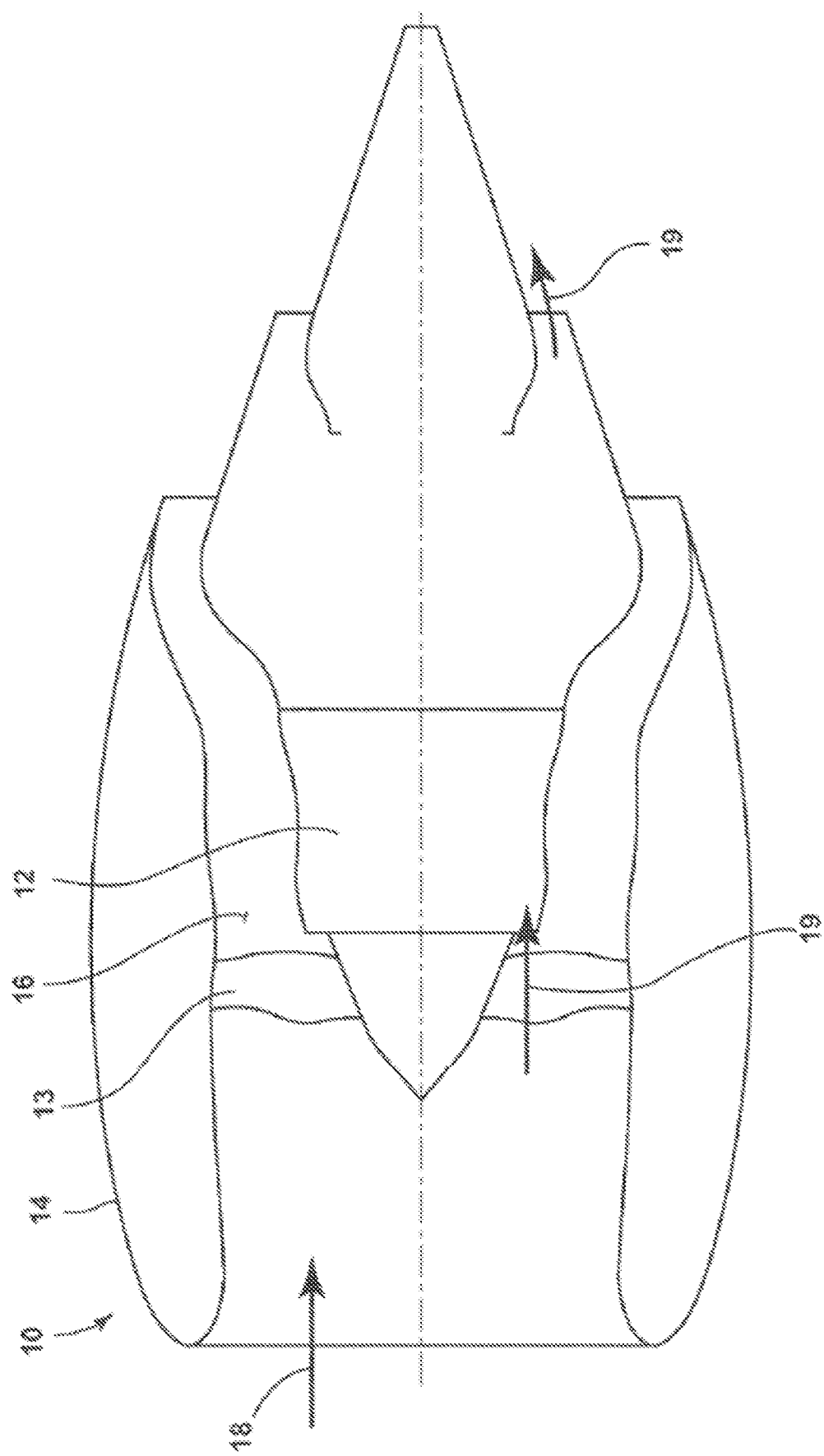
FIG. 1 is a schematic view of an exemplary turbofan jet engine with a portion of the outer nacelle cut away for clarity.

FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path as schematically illustrated by the arrow 18. A combustion airflow is schematically illustrated by the arrows 19.

Figure 2:
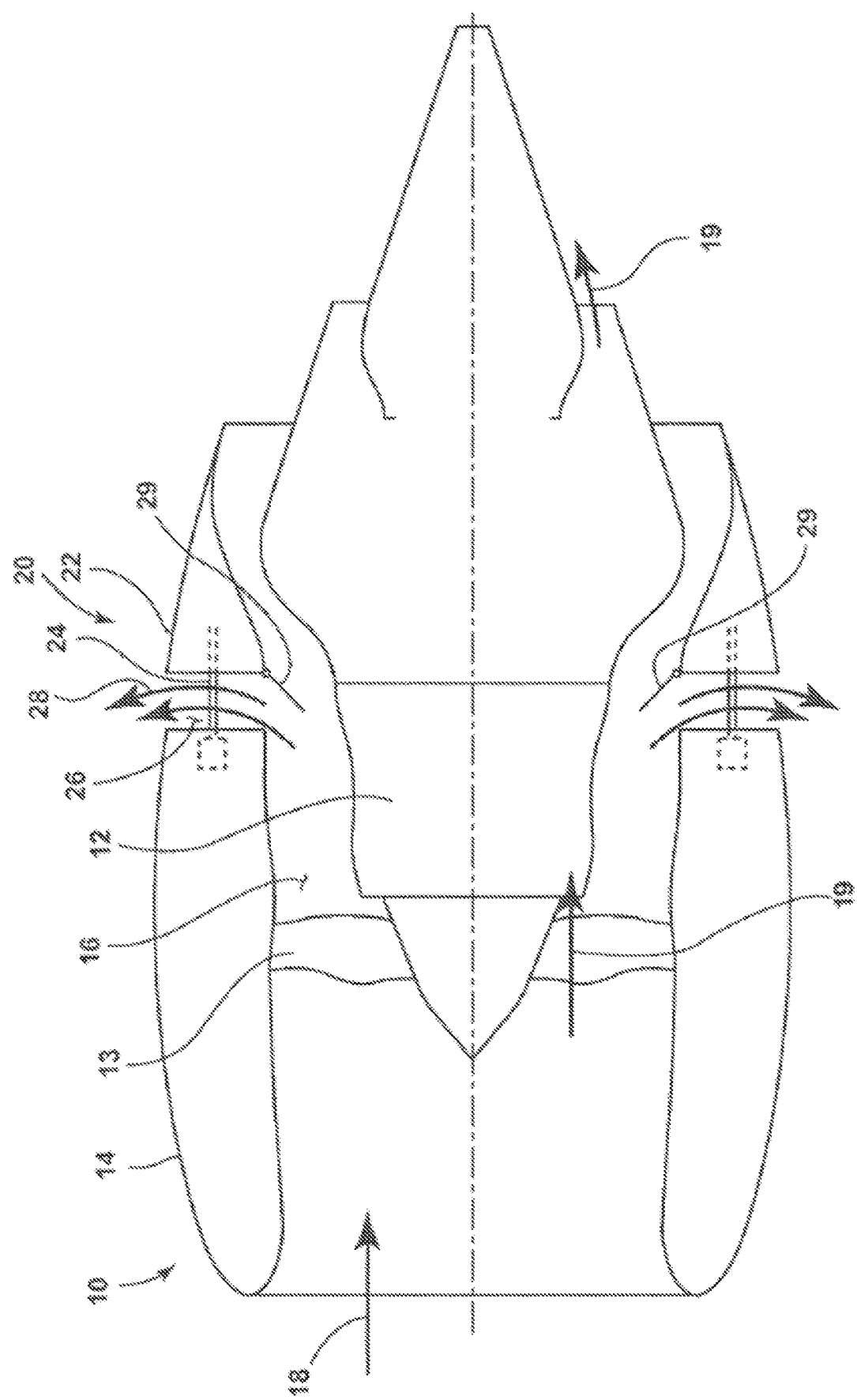
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. An electromechanical actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the airflow path between the movable element 22 and the forward portion of the nacelle 14.

Figure 3:
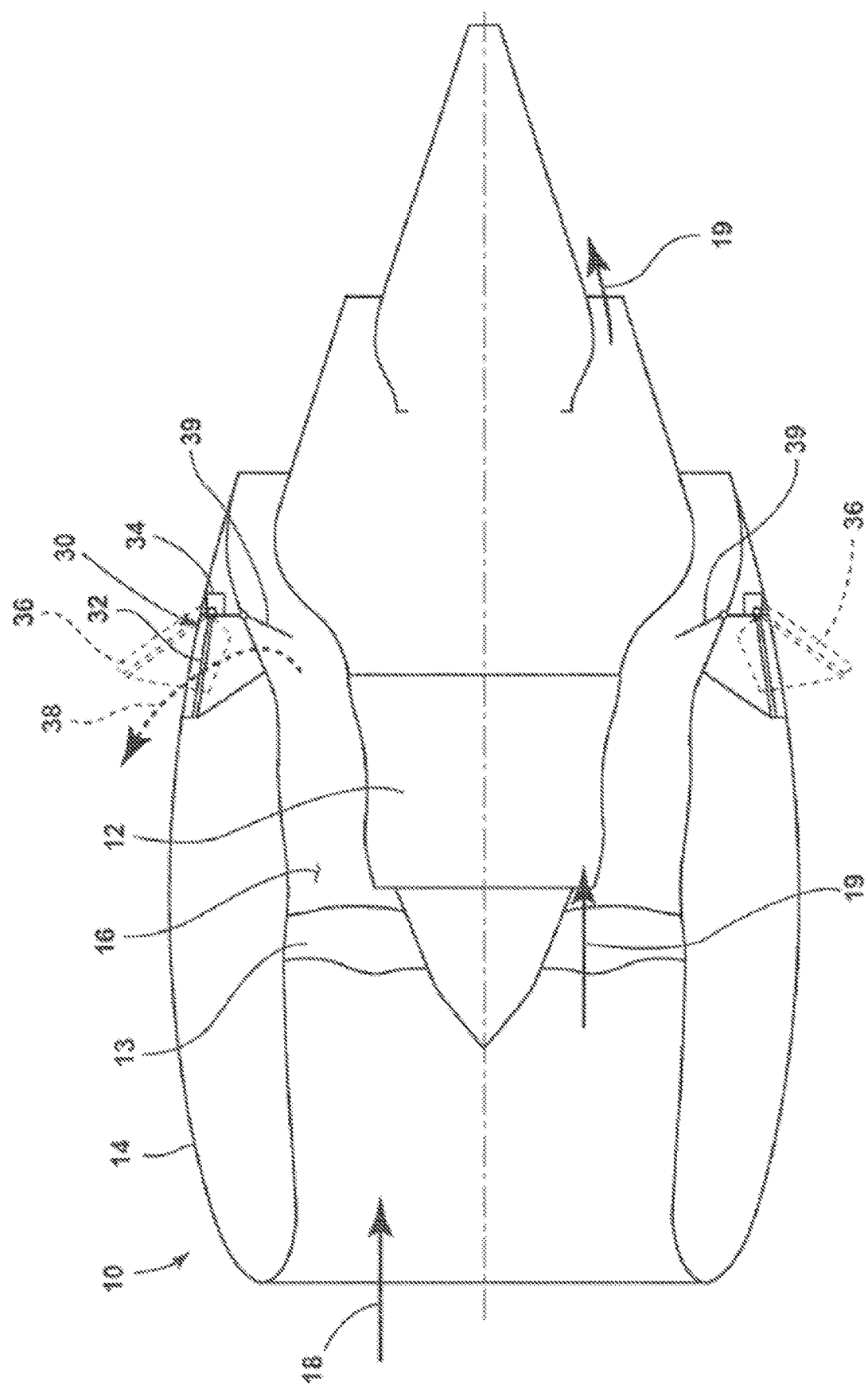
FIG. 3 is a schematic view of the engine of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. An electromechanical actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector or flap 39 may be included to aid in directing the airflow path outward.

In both illustrative examples, the thrust reverser changes the direction of the thrust force. Both the thrust reverser 20 and the thrust reverser 30 have been described as electromechanically operated systems and an electromechanical actuator has been schematically illustrated. In some embodiments, the thrust reverser 20 and/or the thrust reverser 30 can be powered by fluids (e.g., pneumatic, hydraulic), by any appropriate electromechanical actuator (e.g., brushed or brushless DC motors, synchronous or asynchronous AC motors, linear or rotary servos, generators), or by any other appropriate power source or actuator type.

Figure 4:
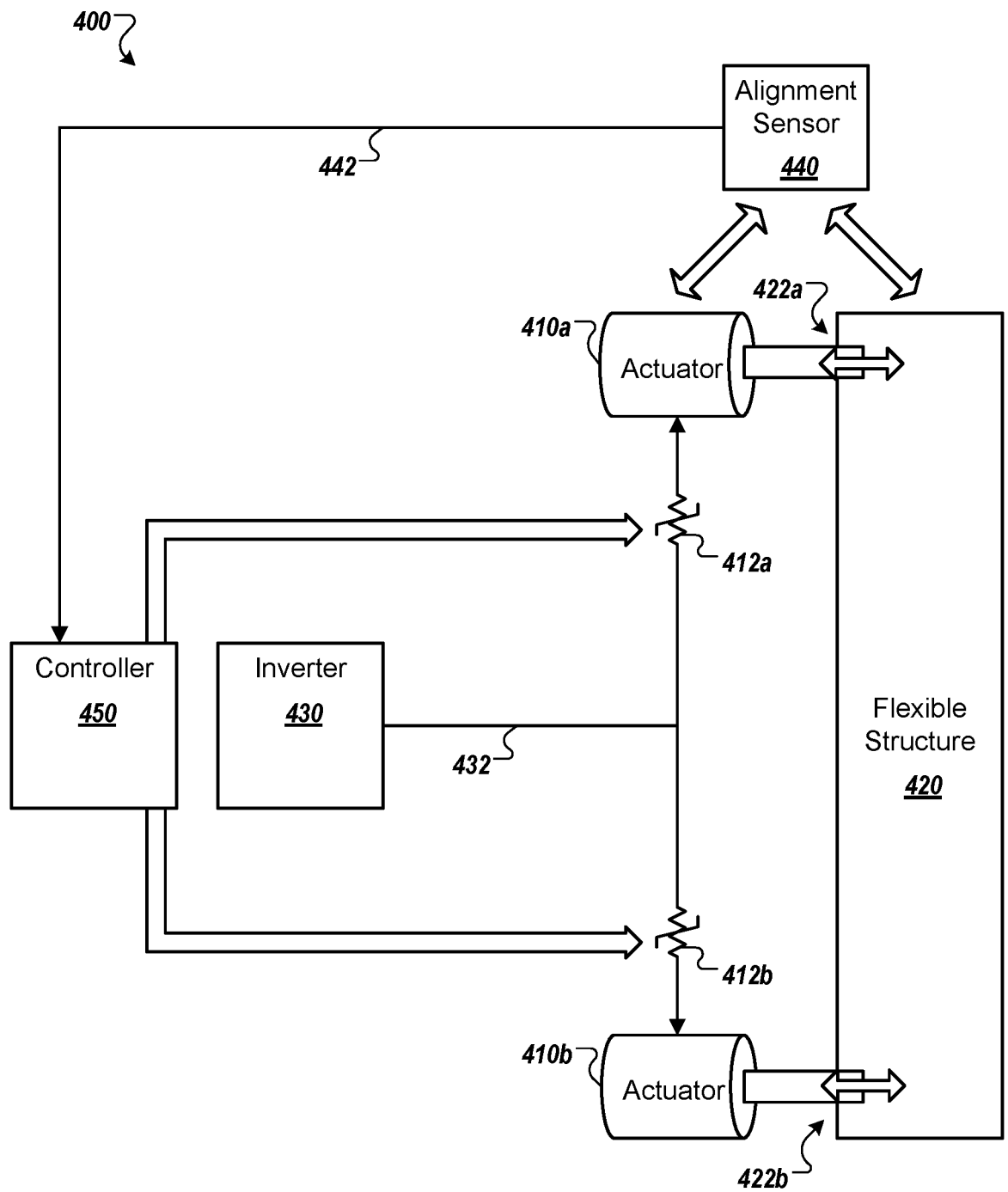
FIG. 4 is a block diagram of an example synchronized motion control system.

FIG. 4 is a block diagram of an example synchronized motion control system 400. The system 400 includes an electromechanical actuator 410a and an electromechanical actuator 410b configured to urge movement of a flexible structure 420 (e.g., a flexible element, a flexible translating thrust reverser cowl). In some embodiments, the flexible structure 420 can be a reverser element of an aircraft thrust reverser actuator system (TRAS). The electromechanical actuator 410a is coupled to and configured to urge movement of a portion 422a of the flexible structure 420. The electromechanical actuator 410b is coupled to and configured to urge movement of a portion 422b of the flexible structure 420.

In some embodiments, the electromechanical actuator 410a and/or 410b can be examples of the example electromechanical actuator 24 of FIG. 2 or the example electromechanical actuator 34 of FIG. 3. In some embodiments, the flexible structure 420 can be the example moveable element 22 or the example moveable element 32.

In general, a very stiff translating cowl can inherently provide a level of position synchronization and load sharing between actuators that are connected to different locations on it. However, the increased flexibility of more modern cowl designs (e.g., the flexible structure 420) has also increased the need to detect, avoid, and/or overcome jamming through better control of position, velocity, torque, current and power of individual motors (e.g., electromechanical actuators 410a-410b) connected to different locations of the translating cowl.

In some embodiments, the electromechanical actuators 410a-410b can be electric motors. Typically, individual electric machines (e.g. brushless direct current motors, or "BLDC"s) are controlled very precisely by dedicated individual drivers, one per electric motor, using techniques such as field oriented control. As the number of BLDCs increases, so too does the weight, space, and cost of the related drivers. The challenge for electromechanical TRAS, (EMTRAS) is to use a single driver for multiple induction motors while stringently detecting and controlling jamming of flexible translating cowls, without adding potentially expensive and/or unreliable sensors or drivers.

The electromechanical actuator 410a is an electromechanical device that has an in-line impedance 412a, symbolically represented as a variable resistor. The electromechanical actuator 410b is an electromechanical device that has an in-line impedance 412b, symbolically represented as a variable resistor. In some embodiments, the in-line impedances 412a and/or 412b can be the impedance of one or more stator windings, or one or more rotor windings, or combinations or both and/or any other appropriate internal characteristic of the electromechanical actuators 410a, 410b. In some embodiments, the effective impedances of the in-line impedances 412a and/or 412b can be based on the resistances, capacitances, and/or inductances of a stator or wound rotor of one of both of the electromechanical actuators 410a and/or 410b. In some embodiments, the in-line impedances 412a and/or 412b can be replaced by external impedances or resistances (e.g., a clutch or brake that can be adjustably applied to the output of one or both of the electromechanical actuators 410a, 410b to slow one actuator relative to the other).

The system 400 also includes an inverter 430 (e.g., a variable frequency drive, VFD). In some embodiments, one of the simplest, most cost effective, and most reliable architectures for EMTRAS applications appears to be a single inverter driving multiple induction motors whose asymmetric positions, velocities, torques and electrical current (or power) are controlled electrically without the use of a dedicated mechanical synchronization device. In the illustrated example, the inverter 430 is configured to provide power to the electromechanical actuators 410a and 410b over a power bus 432. In the illustrated example, the inverter 430 provides single or multi-phase power to both the electromechanical actuator 410a and the electromechanical actuator 410b based on power from the inverter 430 in a parallel electrical configuration. In some embodiments, the use of a single inverter (e.g., such as the inverter 430) to drive multiple actuators simultaneously can reduce the total weight, size, and/or cost of the system 400. The power provided by the inverter 430 at least partly flows through one or both of the in-line impedances 412a and/or 412b.

In the illustrated example, since the electromechanical actuator 410a and the electromechanical actuator 410b are both powered from the power bus 432, the electromechanical actuator 410a and the electromechanical actuator 410b may remain substantially synchronized when unloaded. However, the electromechanical actuator 410a and the electromechanical actuator 410b are loaded by the flexible structure 420, which may flex and/or otherwise become misaligned due to internal or external mechanical forces (e.g., uneven airflow over a reverser element, unequal amounts of friction in mechanical linkages or slides).

The system 400 includes an alignment sensor system 440. The alignment sensor system 440 includes a feedback sensor configured to detect flexure, misalignment, structural stress, and/or other asynchronicity among the electromechanical actuator 410a, the electromechanical actuator 410b, and/or the flexible structure 420 that might be indicative or predictive of mechanical jamming, and provide a feedback signal 442 that is indicative of such conditions. Several example embodiments of the alignment sensor system 440 will be discussed in more detail in the descriptions of FIGS. 5-7.

The system 400 includes a controller 450. The controller 450 is configured to receive an alignment and/or flexure feedback signal 442 from the alignment sensor system 440, and is configured to control one or both of the electromechanical actuator 410a and the electromechanical actuator 410b by modifying the operation of one or both of the electromechanical actuator 410a and the electromechanical actuator 410b to correct for detected misalignments. In general, the controller 450 modifies one or more stator or rotor in-line impedances (e.g., resistance, inductance, capacitance) at run time to achieve a particular control goal or set point that may be a combination of one or more of position or position difference of two or more actuators, velocity or velocity difference of two or more actuators, torque or torque difference of two or more actuators or prescribed torque for avoiding or overcoming jamming for protection of actuators or a transcowl, and/or coil current or coil current difference of two or more actuators or predetermined maximum allowable coil current for protection of actuators and/or drivers.

In operation, the controller 450 modifies one or both of the in-line impedances 412a and/or 412b to alter one or more of the position, velocity, torque, current, and/or power of one of the electromechanical actuators 410a or 410b relative to its companion actuator, and bring the moveable element back into alignment. For example, if feedback from the alignment sensor system 440 indicates that the electromechanical actuator 410a is leading the electromechanical actuator 410b, the controller 450 can increase the in-line impedance 412a relative to the in-line impedance 412b. By increasing the in-line impedance 412a, the amount of torque produced by the electromechanical actuator 410a can be reduced relative to the electromechanical actuator 410b. In some implementations, increasing the in-line impedance 412a to reduce torque can cause the output of the electromechanical actuator 410a to slow down and allow the output of the electromechanical actuator 410b to catch up until alignment is sufficiently restored.

In some embodiments, impedance, resistance, and/or reactance can be varied in an analog or digital manner. For example, analog variation can be performed by using a variable resistor (e.g., rheostat), a variable capacitor, and/or a variable inductor. In another example, in digital architecture, switching diodes can be controlled to switch in fixed value resistors, capacitors, and/or inductors. In some embodiments, the controller 450 can be configured to switch the diodes (e.g., depending on the position of the actuators relative to each other). In some embodiments, one or both of resistance and reactance can be varied at substantially the same time to provide any appropriate values of resistance and reactance at any appropriate time.

While the example system 400 is shown and described as having two actuators (e.g., the electromechanical actuator 410a and the electromechanical actuator 410b), the system 400 can be modified to include three, four, ten, or any other appropriate number of actuators. In some embodiments, some or all of the additional actuators may be powered by the power bus 432. In some embodiments, some or all of the additional actuators may include in-line impedances (e.g., such as the in-line impedances 412a, 412b) that can be modified by the controller 450.

In the illustrated example the flexible structure 420 is generally described as being operated by actuators (e.g., the electromechanical actuator 410a and the electromechanical actuator 410b), but other solutions exist. In some embodiments, movement of the flexible structure may need to be resisted (e.g., instead of urged) in order to control position and alignment. For example, airflow over the flexible structure 420 may create an aiding force that urges movement of the flexible structure 420 (e.g., a translating cowl being drawn open by wind resistance during deployment). The electromechanical actuator 410a and the electromechanical actuator 410b can be embodied as generators configured to produce power (e.g., to the inverter 430) during such operations, and provide a controllable (e.g., by the controller 450) amount of mechanical resistance during generation of power that can be individually controlled by modifying one or both of the in-line impedances 412a, 412b.

Figure 5:
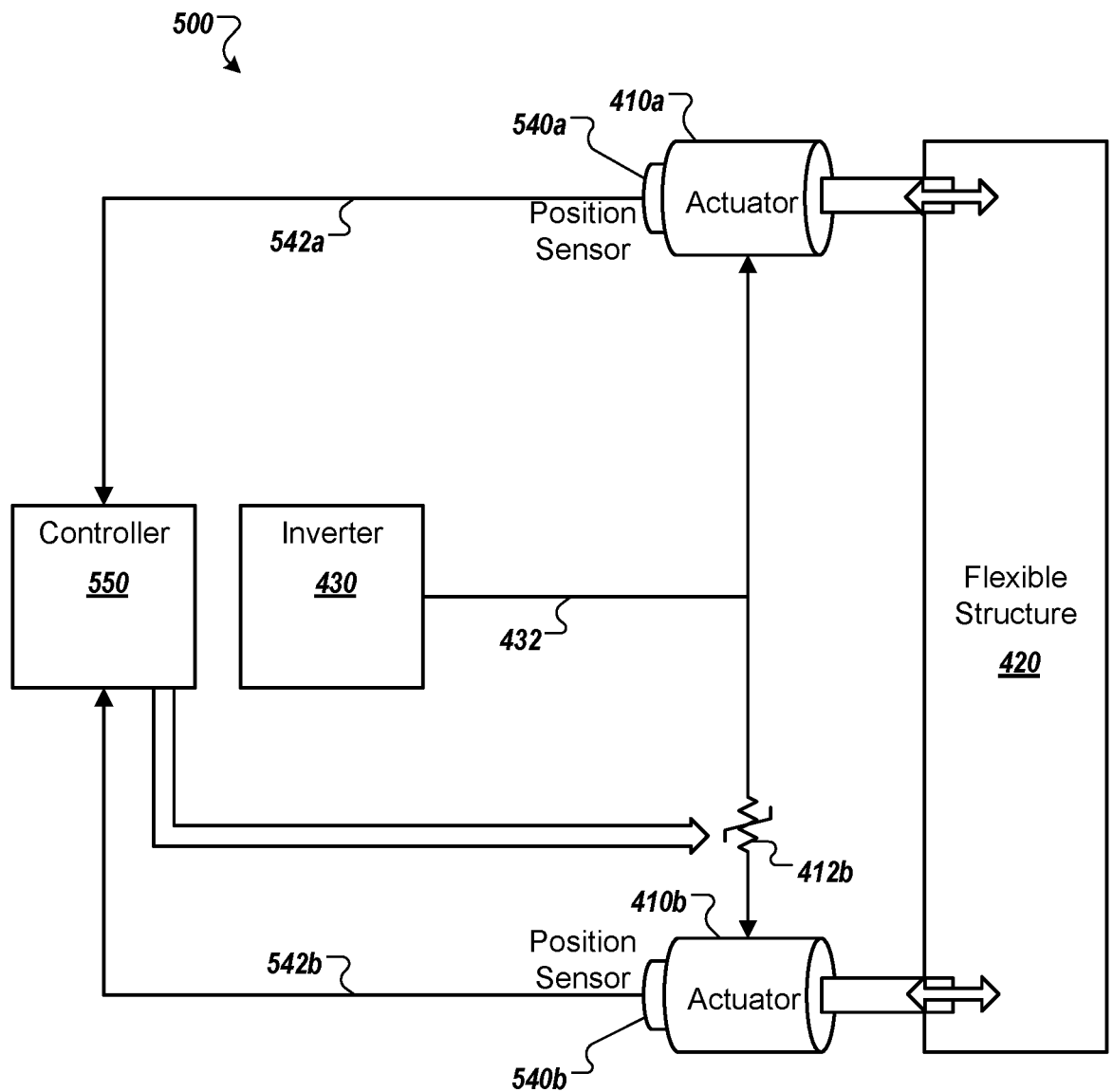
FIG. 5 is a block diagram of an example embodiment of the synchronized motion control system of FIG. 4.

FIG. 5 is a block diagram of an example embodiment of the example synchronized motion control system 400 of FIG. 4. FIG. 5 shows a motion control system 500. In some embodiments, the system 500 can be a modification of the system 400. The system 500 includes the example electromechanical actuator 410a, the example electromechanical actuator 410b having the in-line impedance 412b, the example flexible structure 420, the example inverter 430, and the example power bus 432 of the system 400 of FIG. 4.

In the illustrated example, the system 500 includes a position sensor 540a that is configured to provide a feedback signal 542a representative of the output position of the electromechanical actuator 410a (e.g., length of linear extension, rotational position, rotary or linear output velocity). The system 500 also includes a position sensor 540b that is configured to provide a feedback signal 542b representative of the output position of the electromechanical actuator 410b.

A controller 550 is configured to receive the feedback signals 542a, 542b, and modify the in-line impedance 412b. In some embodiments, the controller 550 can be the example controller 450 of FIG. 4. The controller 550 is configured to identify difference between the positions of the electromechanical actuator 410a and the electromechanical actuator 410b based on the feedback signals 542a, 542b, and modify the in-line impedance 412b in order to alter one or more of the position, velocity, torque, current, and/or power of the electromechanical actuator 410b relative to one or more of the position, velocity, torque, current, and/or power of the electromechanical actuator 410a. For example, by controllably modifying the operation of the electromechanical actuator 410b relative to the electromechanical actuator 410a, the movement of the electromechanical actuator 410b can be slowed or accelerated relative to the electromechanical actuator 410a, substantially restoring the synchronicity of their movements and/or substantially reducing the amount of flex or stress across the flexible structure 420.

Figure 6:
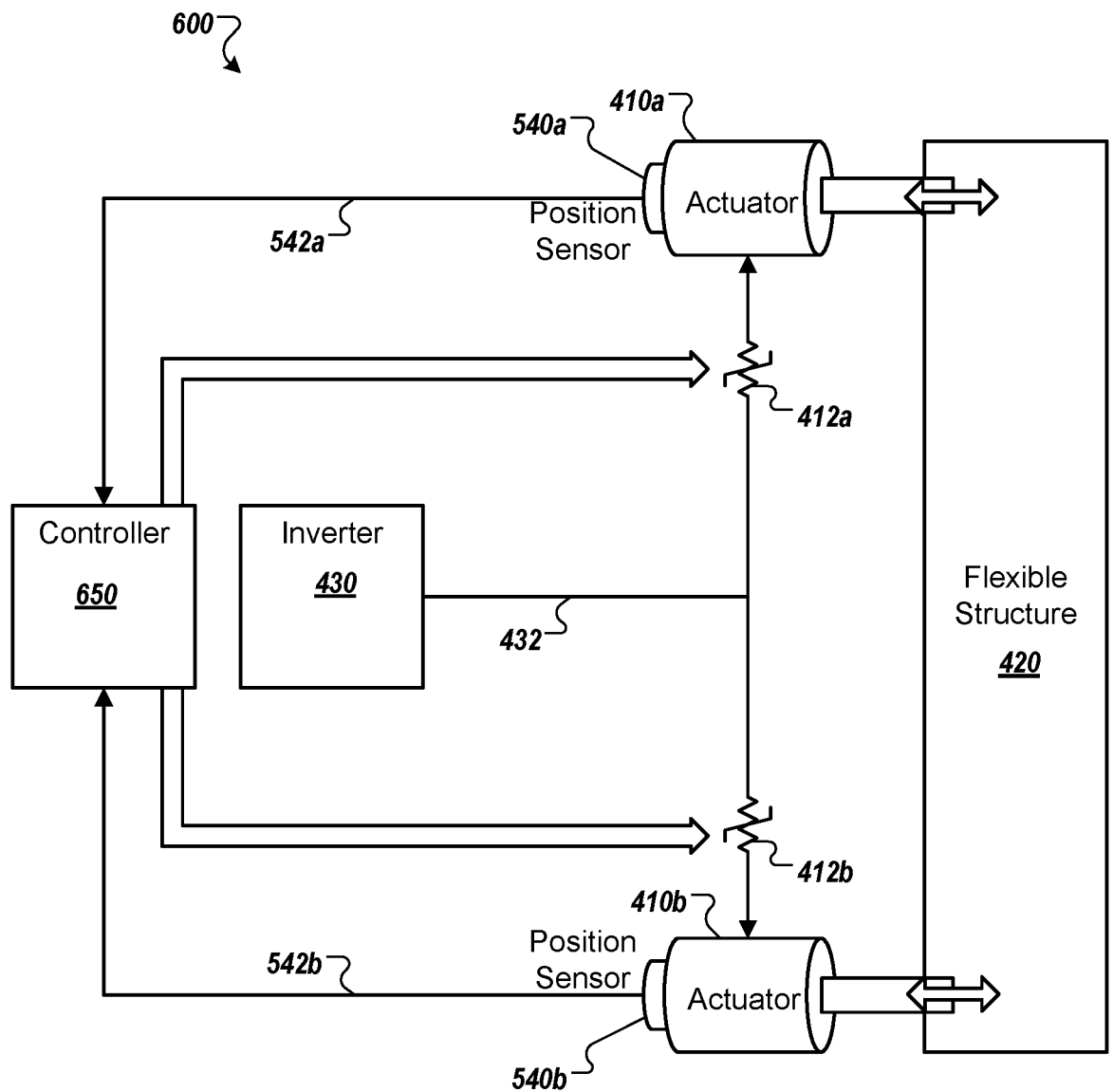
FIG. 6 is a block diagram of an example embodiment of the example synchronized motion control system of FIG. 4.

FIG. 6 is a block diagram of an example embodiment of the example synchronized motion control system 400 of FIG. 4. FIG. 6 shows a motion control system 600. In some embodiments, the system 600 can be a modification of the system 400. The system 600 includes the example electromechanical actuator 410a having the in-line impedance 412a, the example electromechanical actuator 410b having the in-line impedance 412b, the example flexible structure 420, the example inverter 430, and the example power bus 432 of the system 400 of FIG. 4.

In the illustrated example, the system 600 includes the position sensor 540a that is configured to provide the feedback signal 542a representative of the output position of the electromechanical actuator 410a (e.g., length of linear extension, rotational position, rotary or linear output velocity). The system 600 also includes the position sensor 540b that is configured to provide the feedback signal 542b representative of the output position of the electromechanical actuator 410b.

A controller 650 is configured to receive the feedback signals 542a, 542b, and modify the in-line impedances 412a and/or 412b. In some embodiments, the controller 650 can be the example controller 450 of FIG. 4. The controller 650 is configured to identify difference between the positions of the electromechanical actuator 410a and the electromechanical actuator 410b based on the feedback signals 542a, 542b, and modify the in-line impedances 412a and/or 412b in order to alter one or more of the position, velocity, torque, current, and/or power of one or both of the electromechanical actuator 410a and/or 410b relative to one another. For example, by controllably modifying the operation of the electromechanical actuator 410a relative to the electromechanical actuator 410b (or vice versa), the relative movement of the electromechanical actuator 410a can be slowed or accelerated relative to the electromechanical actuator 410b, substantially restoring the synchronicity of their movements and/or substantially reducing the amount of flex or stress across the flexible structure 420.

Figure 7:
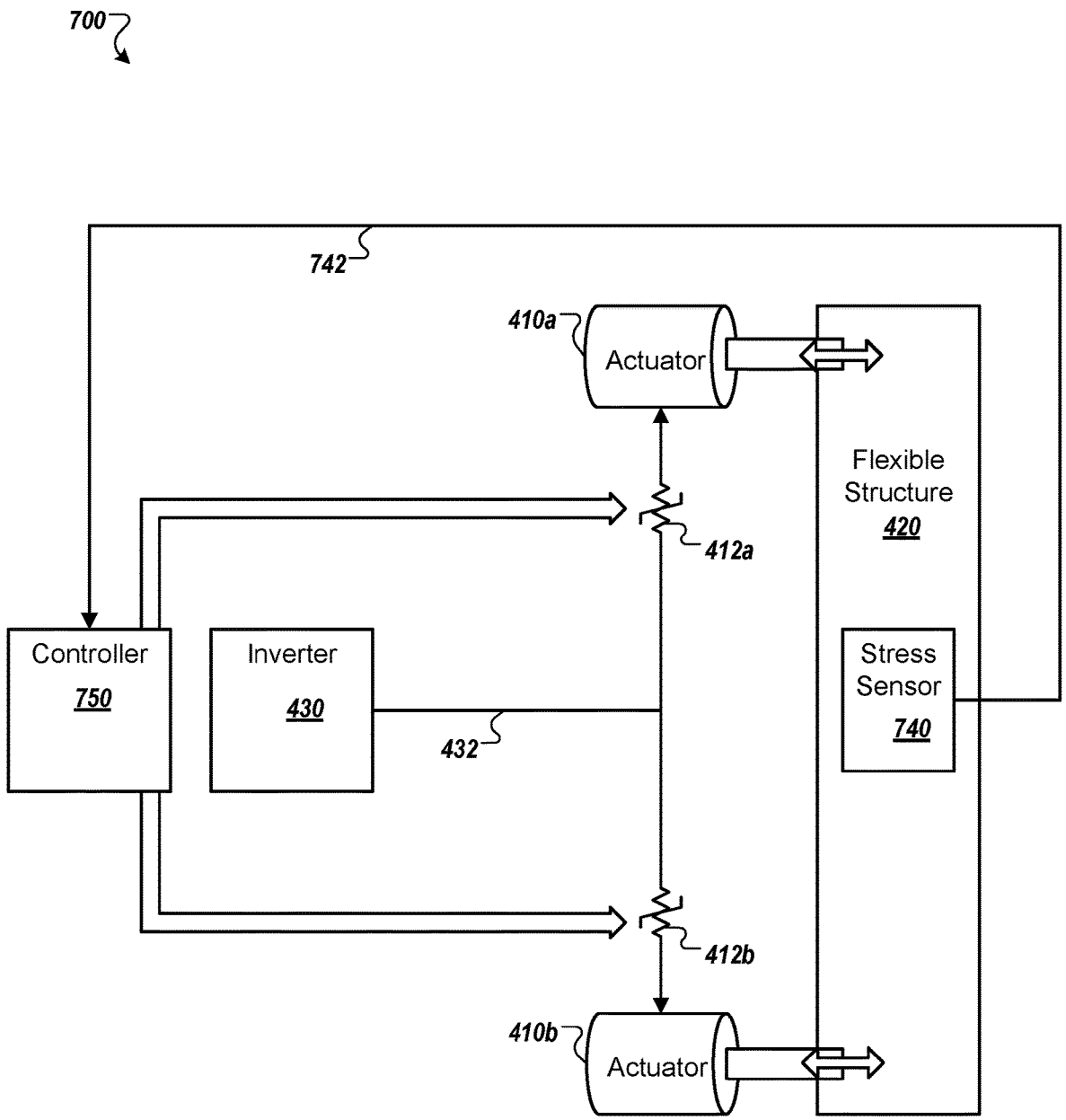
FIG. 7 is a block diagram of an example embodiment of the example synchronized motion control system of FIG. 4.

FIG. 7 is a block diagram of an example embodiment of the example synchronized motion control system of FIG. 4. FIG. 7 shows a motion control system 700. In some embodiments, the system 700 can be a modification of the system 400. The system 700 includes the example electromechanical actuator 410a having the in-line impedance 412a, the example electromechanical actuator 410b having the in-line impedance 412b, the example flexible structure 420, the example inverter 430, and the example power bus 432 of the system 400 of FIG. 4.

In the illustrated example, the system 700 includes a stress sensor 740 (e.g., load cell, strain gauge sensor) that is configured to provide the feedback signal 742 representative of a structural stress, strain, and/or flexure of the flexible member (e.g., due to misalignment or asynchrony of the electromechanical actuators 410a and 410b).

A controller 750 is configured to receive the feedback signal 742 and modify the in-line impedances 412a and/or 412b based on the feedback. In some embodiments, the controller 750 can be the example controller 450 of FIG. 4. The controller 750 is configured to identify a flex across the flexible structure 420 and modify the in-line impedances 412a and/or 412b in order to alter one or more of the position, velocity, torque, current, and/or power of one or both of the electromechanical actuator 410a and/or 410b relative to one another. For example, by controllably modifying the operation of the electromechanical actuator 410a relative to the electromechanical actuator 410b (or vice versa), the relative movement of the electromechanical actuator 410a can be slowed or accelerated relative to the electromechanical actuator 410b, substantially restoring the synchronicity of their movements and/or substantially reducing the amount of flex or stress sensed across the flexible structure 420 by the stress sensor 740.

Figure 8:
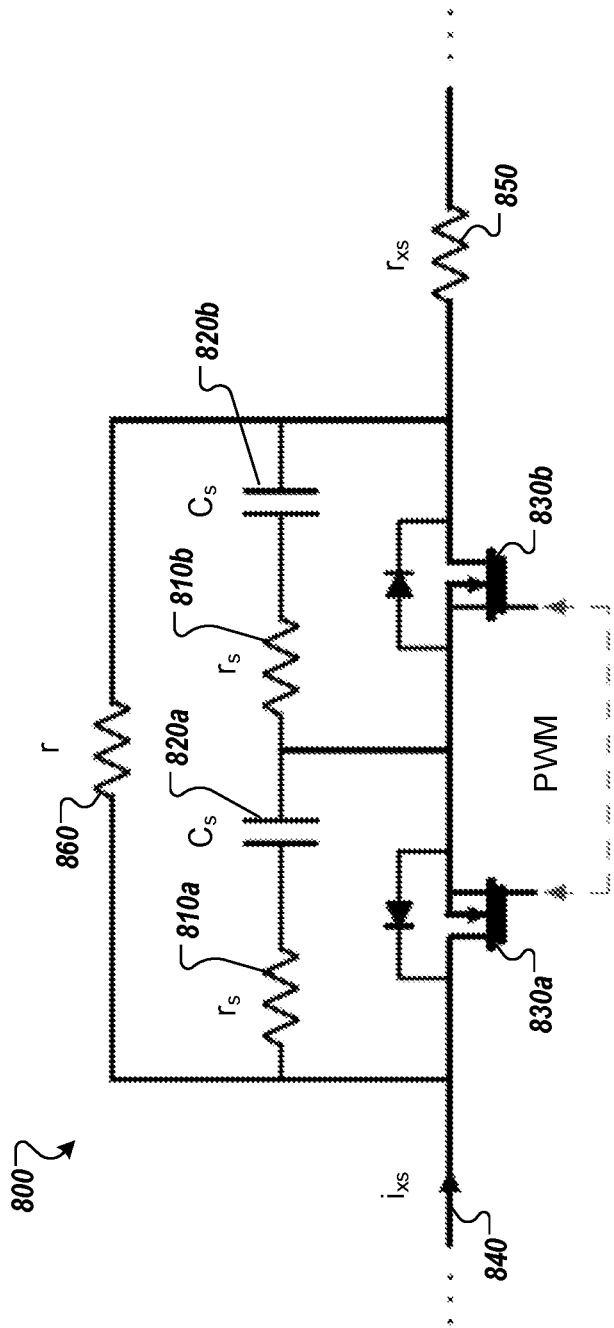
FIG. 8 is a schematic diagram of an example circuit for achieving a desired average external stator resistance.

FIG. 8 is a schematic diagram of an example circuit 800 for achieving a desired average external stator resistance. In some implementations, control of inline stator resistances can be achieved by physical means (e.g., linear or rotary rheostat mechanisms). In some implementations, control of inline stator resistances can be achieved by using power-electronic circuitry such as the circuit 800, where the electronic switches are rated for the current on a single motor phase.

The circuit 800 is configured as a power-electronic circuit with a bi-directional MOSFET arrangement to vary inline stator resistances. The circuit 800 includes a pair of resistors 810a and 810b ($r_s$), and a pair of capacitors 820a and 820b ($C_s$). The resistors 810a, 810b and the capacitors 820a, 820b are configured to provide snubber resistances and capacitances, respectively, across a pair of MOSFETs 830a and 830b. A current ($i_{xs}$), represented by arrow 840 is the current of the stator, and a resistor 850 represents the (nominal) resistance ($r_{xs}$) of a stator phase x, respectively. A resistor 860 (r) represents the 'base' external resistance.

The MOSFETs 830a, 830b receive the same pulse-width modulated (PWM, e.g., fully on or fully off) signal. The bi-directional arrangement allows current to flow in the stator in both directions. Neglecting snubber impedance, the circuit 800 places either the base resistance 860 or 00 in series with the nominal stator resistance 850. By modulation of the PWM duty cycle, a desired external resistance can be achieved in a fast-average sense, where the fast-average of a signal f (t) can be defined as follows:

$$\bar{f}(t) := \frac{1}{T_s} \int_0^{T_s} f(t)dt$$

where the bar over f(t) denotes fast-average, and $T_s=1/f_s$ is the time period of the PWM switching cycle with frequency $f_s$.

Figure 9A:
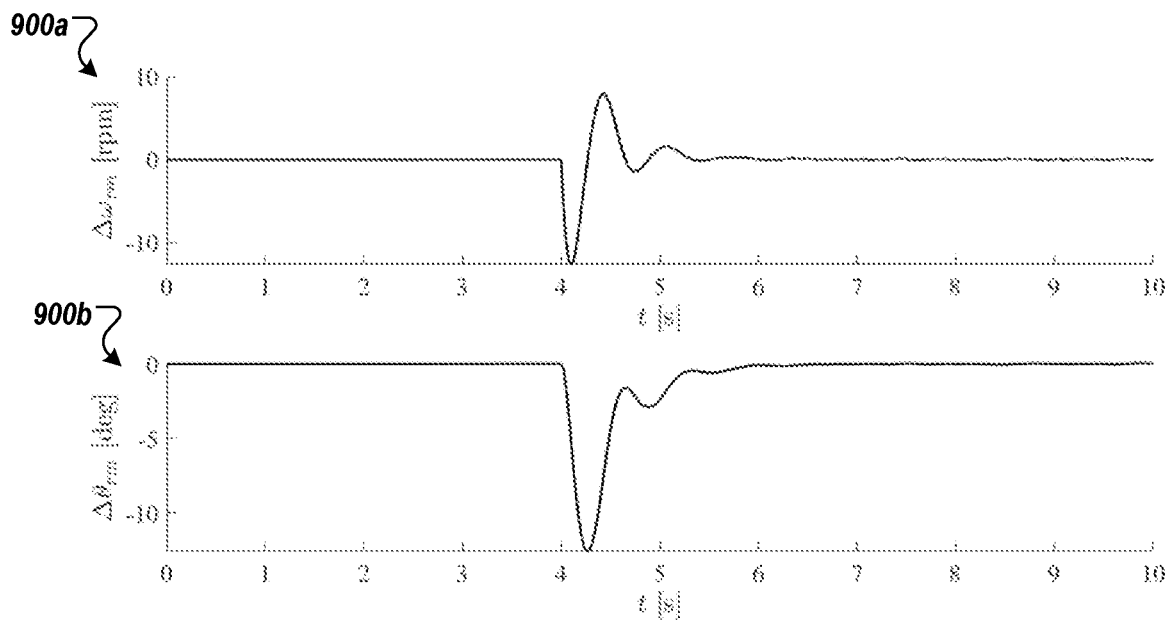
FIGS. 9A and 9B are graphs of example motor synchronizations.
Figure 9B:
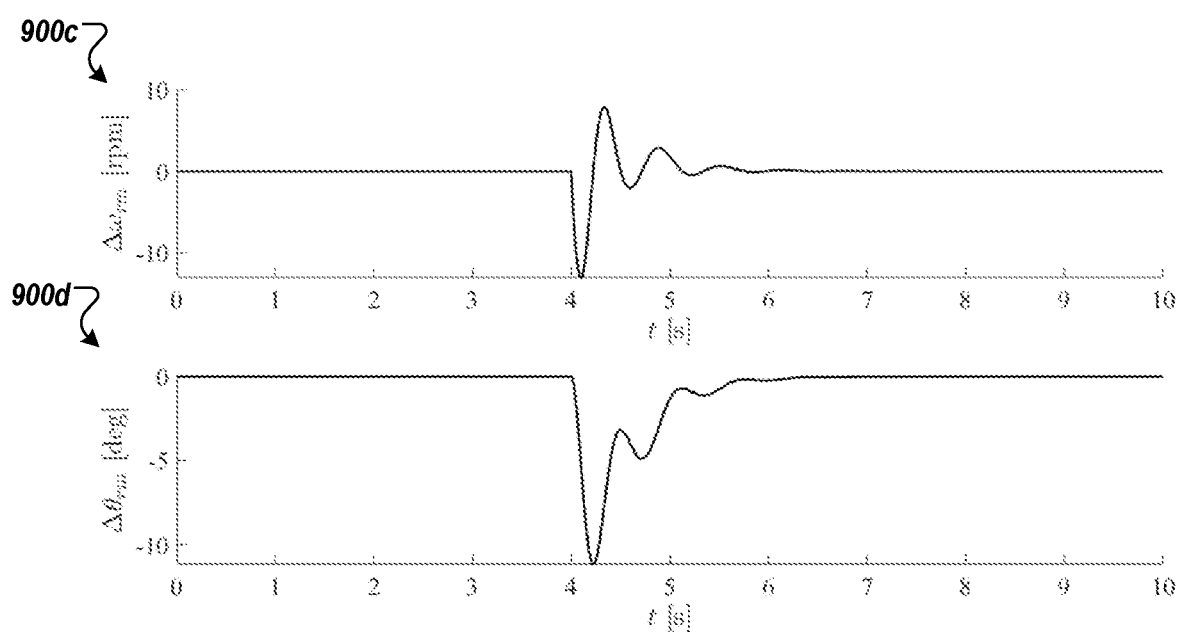

FIGS. 9A and 9B are graphs of example motor synchronizations. FIG. 9A illustrates a simulated example error in rotor position angle using a compensated volts-per-hertz (CVHz) voltage-control strategy, showing that speed, shown as a graph 900a, and position angle, shown as a graph 900b, between two induction machines can be synchronized.

FIG. 9B illustrates a simulated example error in rotor position angle using an indirect rotor-oriented, field-oriented control (IDFOC) current-control strategy, each with multiple induction motors driven from a central converter, showing that speed, shown as a graph 900c, and position angle, shown as a graph 900d, between two induction machines can be synchronized.

Figure 10:
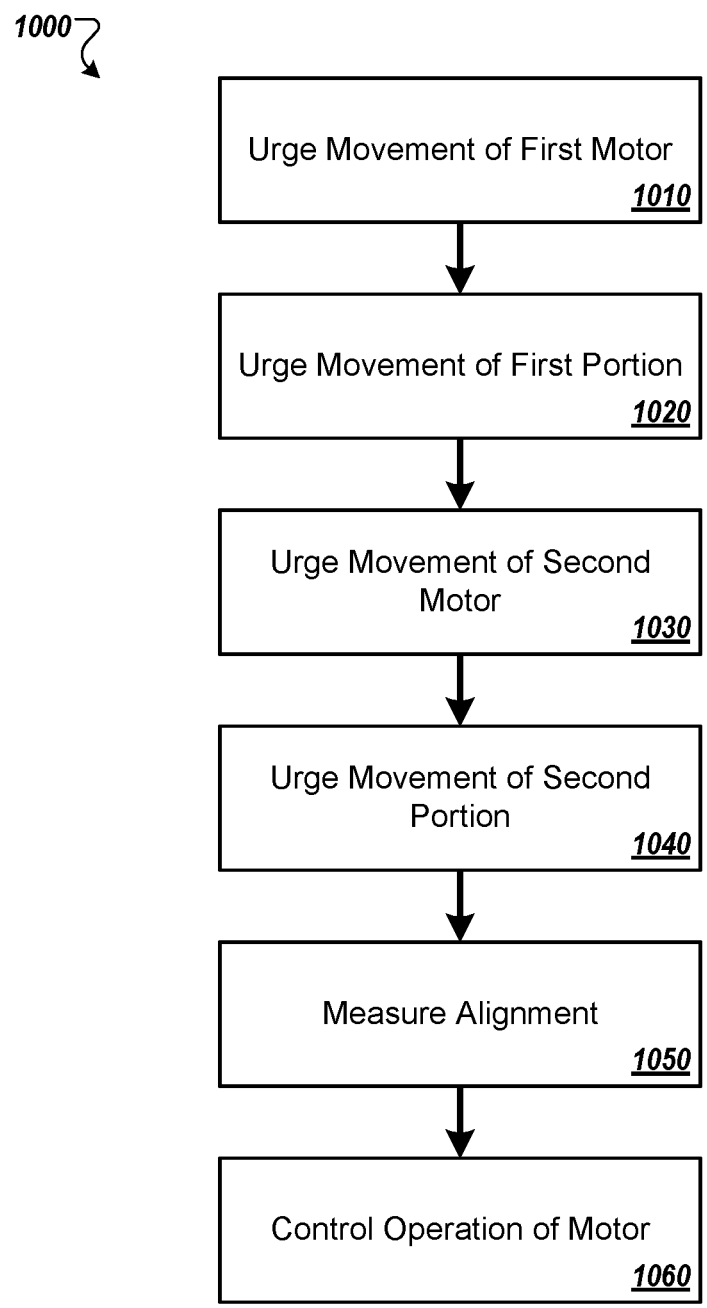
FIG. 10 is a flow diagram of an example process for synchronized motion control.

FIG. 10 is a flow diagram of an example process 1000 for synchronized motion control. In some implementations, the process 1000 can be performed by some or all of the example turbofan jet engine assembly 10 of FIG. 1, the example thrust reverser 20 of FIG. 2, the example thrust reverser 30 of FIG. 3, or any of the example synchronized motion control systems 400-700 of FIGS. 4-7.

At 1010, movement of a first electromechanical device is urged by a power inverter. For example, the example inverter 430 can urge movement of the electromechanical actuator 410a.

At 1020, movement of a first portion of a flexible structure is urged by the first electromechanical device. For example, the electromechanical actuator 410a is coupled to and configured to urge movement of the portion 422a of the flexible structure 420.

At 1030, movement of a second electromechanical device is urged by the power inverter. For example, the example inverter 430 can urge movement of the electromechanical actuator 410b.

At 1040, movement of a second portion of the flexible structure can be urged by the second electromechanical device. For example, the electromechanical actuator 410b is coupled to and configured to urge movement of the portion 422b of the flexible structure 420.

At 1050, an alignment between the first portion and the second portion is identified. For example, the alignment sensor system 440 is configured to sense misalignment between the portion 422a and the portion 422a, and provide the feedback signal 442 to the controller 450 for identification and/or measurement.

In some implementations, identifying an alignment between the first portion and the second portion can include measuring one or more of a first position output, a first velocity, a first torque, or a first coil current of the first electromechanical device, and one or more of a second position output, a second velocity, a second torque, or a second coil current of the second electromechanical device. For example, various embodiments of the alignment sensor 440 can include position output sensors, velocity sensors, torque sensors, coil current sensors, and any appropriate combination of these and/or other types of sensors configured to sense properties of one or more of the electromechanical actuators 410a, 410b, the flexible structure 420, and/or associated components (e.g., brackets, frames, linkages).

In some implementations, identifying an alignment between the first portion and the second portion can include identifying one or more of a position difference, a velocity difference, a torque difference, or a coil current difference between the first electromechanical device and the second electromechanical device. For example, the example controller 550 can compare the feedback signals 542a and 542b from the position sensors 540a and 540b to determine if there is a velocity difference between the electromechanical device 410a and the electromechanical device 410b. In another example, the alignment sensor 440 can be configured to sense torques and/or coil currents of the electromechanical device 410a and the electromechanical device 410b, and provide feedback signals that can be compared by the controller 450 to identify a misalignment.

In some implementations, identifying an alignment between the first portion and the second portion can include measuring structural stress of the flexible structure. For example, the example stress sensor 740 can measure structural stress across the flexible structure 420, and the controller 750 can use those measurements to identify a misalignment between the electromechanical actuator 410a and the electromechanical actuator 410b.

At 1060, operation of at least one of the first electromechanical device or the second electromechanical device is controlled based on the identified alignment. For example, the controller 450 can identify that the portion 422a is lagging behind the portion 422b, and respond by causing the electromechanical actuator 410b to lose a controlled amount of torque in order to allow the electromechanical actuator 410a and the portion 422a to catch up.

In some implementations, controlling operation of at least one of the first electromechanical device or the second electromechanical device can include modifying an in-line impedance of at least one of the first electromechanical device or the second electromechanical device. For example, the controller 450 can alter one or both of the in-line impedance 412a and/or 412b.

In some implementations, controlling operation of at least one of the first electromechanical device or the second electromechanical device can include modifying a first effective impedance of a first stator winding or a first rotor winding of the first electromechanical device relative to a second effective impedance of a second stator winding or a second rotor winding of the second electromechanical device. For example, the example in-line impedance 412a can be an impedance of a rotor winding of the electromechanical actuator 410a, an impedance of a stator winding of the electromechanical actuator 410a, or both. In another example, the example in-line impedance 412b can be an impedance of a rotor winding of the electromechanical actuator 410b, an impedance of a stator winding of the electromechanical actuator 410b, or both.

In some implementations, at least one of the first electromechanical device or the second electromechanical device can be an electrical induction motor. For example one or both of the example electromechanical actuators 410a, 410b can be an electrical induction motor (e.g., an asynchronous AC motor).

In some implementations, the first electromechanical device can be mechanically linked to the second electromechanical device through the flexible structure. For example, the example electromechanical actuators 410a, 410b can be coupled to each other through the flexible structure 420.

In some implementations, the flexible structure can be a translating cowl of an aircraft turbine engine thrust reverser actuation system. For example, the flexible structure 420 can be the example movable element 22 of FIG. 2 or the example movable element 32 of FIG. 3.

In some implementations, controlling operation of at least one of the first electromechanical device and/or the second electromechanical device can include performing one or more of position control, velocity control, torque control, or power control of at least one of the first electromechanical device or the second electromechanical device. For example, the controller 450 can simultaneously or separately control one or more of the position, velocity, torque, and/or power of one or both of the electromechanical actuators 410a, 410b by controlling one or both of the in-line impedances 412a, 412b.

Figure 11:
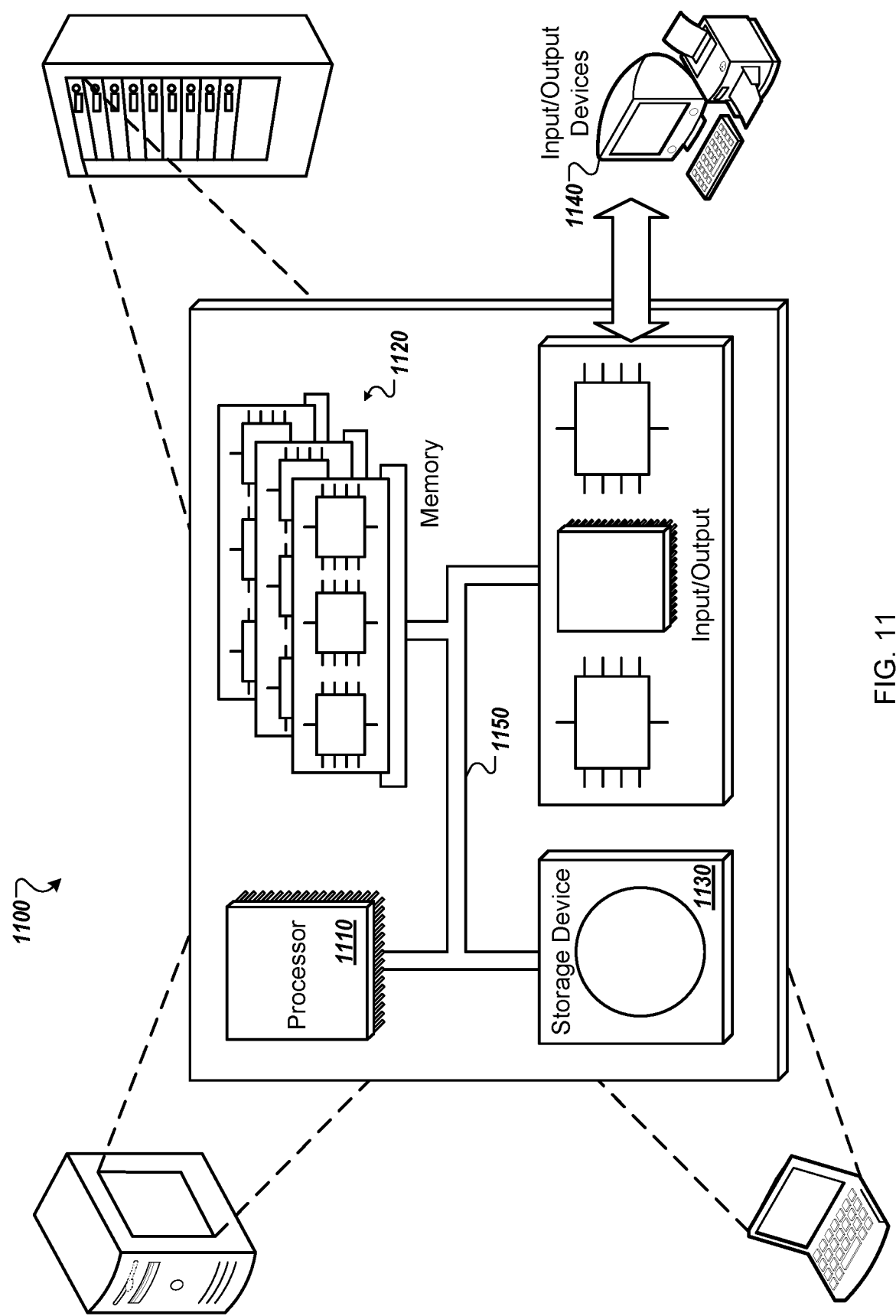
FIG. 11 is a schematic diagram of an example of a generic computer system.

FIG. 11 is a schematic diagram of an example of a generic computer system 1100. The system 1100 can be used for the operations described in association with the method 1000 according to one implementation. For example, the system 1100 may be included in either or all of the controllers 450, 550, 650, and 750.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
a flexible structure of an aircraft;
a power inverter;
a first electromechanical device configured to urge movement of a first portion of the flexible structure based on power received from the power inverter;
a second electromechanical device configured to urge movement of a second portion of the flexible structure based on power received from the power inverter;
a power bus configured to conduct power from the power inverter to the first electromechanical device and to the second electromechanical device concurrently;
a feedback sensor configured to provide a feedback signal indicative of alignment between the first portion and the second portion; and
a controller configured to control operation of at least one of the first electromechanical device and the second electromechanical device based on the feedback signal, wherein the controller is configured to modify a first electrical impedance of the first electromechanical device to be different from a second electrical impedance of the second electromechanical device.

2. The system of claim 1, wherein the first electrical impedance is an in-line impedance of the first electromechanical device.

3. The system of claim 1, wherein the first electrical impedance is a first effective impedance of a first stator winding or a first rotor winding of the first electromechanical device, and the controller is configured to modify the first effective impedance relative to a second effective impedance of a second stator winding or a second rotor winding of the second electromechanical device.

4. The system of claim 1, wherein at least one of the first electromechanical device or the second electromechanical device is an electrical induction motor.

5. The system of claim 1, wherein the first electromechanical device is mechanically linked to the second electromechanical device through the flexible structure.

6. The system of claim 1, wherein the flexible structure is a translating cowl of an aircraft turbine engine thrust reverser actuation system.

7. The system of claim 1, wherein the feedback sensor is configured to determine one or more of a first position output, a first velocity, a first torque, or a first coil current of the first electromechanical device, and one or more of a second position output, a second velocity, a second torque, or a second coil current of the second electromechanical device.

8. The system of claim 1, wherein the feedback sensor is configured to determine one or more of a position difference, a velocity difference, a torque difference, or a coil current difference between the first electromechanical device and the second electromechanical device.

9. The system of claim 1, wherein the feedback sensor is configured to measure structural stress of the flexible structure.

10. The system of claim 1, wherein the controller is configured to perform one or more of position control, velocity control, torque control, or power control of at least one of the first electromechanical device or the second electromechanical device.

11. The system of claim 1, wherein the controller is configured to modify the first electrical impedance while the first electromechanical device and the second electromechanical device concurrently receive power from the power inverter.

12. A turbofan engine assembly comprising:
   a turbofan engine;
   a nacelle surrounding the turbofan engine and defining an annular bypass duct through the turbofan engine to define a generally forward-to-aft bypass airflow path; and
   a thrust reverser comprising:
      a flexible element, moveable to and from a reversing position where at least a portion of bypass airflow is reversed;
      a power inverter;
      a first electromechanical device configured to urge movement of a first portion of the flexible element based on power received from the power inverter;
      a second electromechanical device configured to urge movement of a second portion of the flexible element based on power received from the power inverter;
      a power bus configured to conduct power from the power inverter to the first electromechanical device and to the second electromechanical device concurrently;
      a feedback sensor configured to provide a feedback signal indicative of alignment between the first portion and the second portion; and
      a controller configured to control operation of at least one of the first electromechanical device and the second electromechanical device based on the feedback signal, wherein the controller is configured to modify a first electrical impedance of the first electromechanical device to be different from a second electrical impedance of the second electromechanical device.

13. The turbofan engine assembly of claim 12, wherein the first electrical impedance is an in-line impedance of the first electromechanical device.

14. The turbofan engine assembly of claim 12, wherein at least one of the first electromechanical device or the second electromechanical device is an electrical induction motor.

15. The turbofan engine assembly of claim 12, wherein the first electromechanical device is mechanically linked to the second electromechanical device through the flexible element.

16. The turbofan engine assembly of claim 12, wherein the flexible element is a translating cowl of an aircraft turbine engine thrust reverser actuation system.

17. The turbofan engine assembly of claim 12, wherein the feedback sensor is configured to determine one or more of a first position output, a first velocity, a first torque, or a first coil current of the first electromechanical device, and one or more of a second position output, a second velocity, a second torque, or a second coil current of the second electromechanical device.

18. The turbofan engine assembly of claim 12, wherein the feedback sensor is configured to determine one or more of a position difference, a velocity difference, a torque difference, or a coil current difference between the first electromechanical device and the second electromechanical device.

19. The turbofan engine assembly of claim 12, wherein the feedback sensor is configured to measure structural stress of the flexible element.

20. The turbofan engine assembly of claim 12, wherein the controller is configured to perform one or more of position control, velocity control, torque control, or power control of at least one of the first electromechanical device or the second electromechanical device.

21. The turbofan engine assembly of claim 12, wherein the controller is configured to modify the first electrical impedance while the first electromechanical device and the second electromechanical device concurrently receive power from the power inverter.

\* \* \* \* \*